US008831859B2

(12) United States Patent
Meitinger et al.

(10) Patent No.: US 8,831,859 B2
(45) Date of Patent: Sep. 9, 2014

(54) METHOD FOR ACCELERATING A VEHICLE AND HYBRID VEHICLE

(75) Inventors: Karl-Heinz Meitinger, München (DE); Stefan Ullmann, München (DE)

(73) Assignee: Audi Aktiengesellschaft, Ingoldstadt (DE)

( * ) Notice: Subject to any disclaimer, the term of this patent is extended or adjusted under 35 U.S.C. 154(b) by 0 days.

(21) Appl. No.: 14/126,709

(22) PCT Filed: May 16, 2012

(86) PCT No.: PCT/EP2012/002094
§ 371 (c)(1),
(2), (4) Date: Dec. 16, 2013

(87) PCT Pub. No.: WO2012/171607
PCT Pub. Date: Dec. 20, 2012

(65) Prior Publication Data
US 2014/0136083 A1 May 15, 2014

(30) Foreign Application Priority Data
Jun. 17, 2011 (DE) .......................... 10 2011 104 395

(51) Int. Cl.
*B60W 10/08* (2006.01)
*F02D 28/00* (2006.01)

(52) U.S. Cl.
CPC .............. *F02D 28/00* (2013.01); *Y10S 903/93* (2013.01); *Y10S 903/902* (2013.01)
USPC ........... 701/110; 701/111; 701/112; 701/113; 123/179.3; 123/179.4; 180/65.285; 903/902; 903/930

(58) Field of Classification Search
CPC .............. F02D 11/105; F02D 2250/18; F02D 2250/21; F02D 2250/22; F02D 2250/24; F02D 41/042; F02D 41/045; B60W 10/06; B60W 10/08; B60W 20/00; B60W 20/10; B60W 20/108; B60W 20/1088; B60W 20/40; F02N 11/08; F02N 11/0803; F02N 11/0814; F02N 11/0818; F02N 11/0833; B60K 17/356; B60K 6/00; B60K 20/00
USPC ............... 701/101, 111, 112, 113; 123/179.3, 123/179.4, 179.1, 179.25, 185.15; 180/165, 180/2.1, 24.06, 205.1, 206.1, 242, 65.1, 180/65.21, 65.26, 65.265, 65.275, 65.28, 180/65.285, 65.31, 65.8
See application file for complete search history.

(56) References Cited

U.S. PATENT DOCUMENTS 6,077,186 A * 6/2000 Kojima et al. ................ 477/3
6,253,127 B1 * 6/2001 Itoyama et al. ............... 701/22

(Continued)

FOREIGN PATENT DOCUMENTS

DE 102004002440 9/2004
DE 102007000331 2/2008

(Continued)

OTHER PUBLICATIONS

International Search Report issued by the European Patent Office in International Application PCT/EP2012/002094 on Aug. 24, 2012.

*Primary Examiner* — Hai Huynh
*Assistant Examiner* — Raza Najmuddin
(74) *Attorney, Agent, or Firm* — Henry M. Feiereisen LLC

(57) ABSTRACT

The functionality of a "Launch Control" is implemented in a hybrid vehicle, i.e. the hybrid vehicle can be accelerated to a maximum degree by starting the internal combustion engine immediately from the stationary state (S20), and acceleration takes place with the aid of the electric motor with full torque (S22) before a changeover to accelerating the internal combustion engine takes place (S24). The "Launch Control" differs from a further mode in which firstly acceleration takes place from the stationary state using a partial torque of the electric motor (S14), with the result that the internal combustion engine can be tow-started by means of the electric motor (S16) before a changeover to acceleration using the internal combustion engine (S18) occurs.

4 Claims, 1 Drawing Sheet

(56) References Cited

U.S. PATENT DOCUMENTS

| | | | |
|---|---|---|---|
| 6,524,219 B2 * | 2/2003 | Mesiti et al. | 477/5 |
| 6,616,569 B2 * | 9/2003 | Hoang et al. | 477/3 |
| 6,830,118 B2 * | 12/2004 | Koelle et al. | 180/65.26 |
| 6,879,888 B2 * | 4/2005 | Ochiai et al. | 701/22 |
| 7,220,217 B2 * | 5/2007 | Tamai et al. | 477/183 |
| 7,770,675 B2 * | 8/2010 | Hayashi | 180/65.265 |
| 8,055,431 B2 * | 11/2011 | Asada et al. | 701/103 |
| 8,322,729 B2 | 12/2012 | Michel et al. | |
| 8,360,183 B2 * | 1/2013 | Sauvlet et al. | 180/65.28 |
| 8,371,593 B2 | 2/2013 | Michel et al. | |
| 8,474,837 B2 | 7/2013 | Meitinger et al. | |
| 8,490,983 B2 | 7/2013 | Schmid et al. | |
| 8,534,684 B2 | 9/2013 | Michel et al. | |
| 8,573,617 B2 | 11/2013 | Meitinger et al. | |
| 8,594,913 B2 * | 11/2013 | Steuernagel | 701/113 |
| 2002/0019290 A1 * | 2/2002 | Mesiti et al. | 477/5 |
| 2004/0149246 A1 | 8/2004 | Itoh et al. | |
| 2007/0199745 A1 * | 8/2007 | Hayashi | 180/65.2 |
| 2008/0004780 A1 | 1/2008 | Watanabe et al. | |
| 2008/0129049 A1 | 6/2008 | Sauvlet et al. | |
| 2010/0204006 A1 | 8/2010 | Mittelberger et al. | |
| 2010/0304921 A1 | 12/2010 | Kaltenbach et al. | |
| 2010/0305820 A1 | 12/2010 | McGee et al. | |
| 2011/0040432 A1 | 2/2011 | Kaltenbach et al. | |
| 2011/0040433 A1 | 2/2011 | Steuernagel | |
| 2011/0203860 A1 * | 8/2011 | Sauvlet et al. | 180/65.28 |
| 2012/0098221 A1 | 4/2012 | Michel et al. | |
| 2012/0126498 A1 | 5/2012 | Michel et al. | |
| 2012/0193882 A1 | 8/2012 | Michel et al. | |
| 2012/0242053 A1 | 9/2012 | Michel et al. | |
| 2012/0256473 A1 | 10/2012 | Schmid et al. | |
| 2012/0261893 A1 | 10/2012 | Meitinger et al. | |
| 2012/0280465 A1 | 11/2012 | Meitinger et al. | |
| 2012/0306173 A1 | 12/2012 | Meitinger et al. | |
| 2012/0306174 A1 | 12/2012 | Schmid et al. | |
| 2014/0024492 A1 * | 1/2014 | Dextreit | 477/3 |

FOREIGN PATENT DOCUMENTS

| | | |
|---|---|---|
| DE | 102006045824 | 4/2008 |
| DE | 102006054740 | 6/2008 |
| DE | 102007045365 | 4/2009 |
| DE | 102007050652 | 4/2009 |
| DE | 102007055828 | 6/2009 |
| DE | 102007061730 | 6/2009 |
| DE | 102010029157 | 12/2010 |
| DE | 102009027642 | 1/2011 |

* cited by examiner

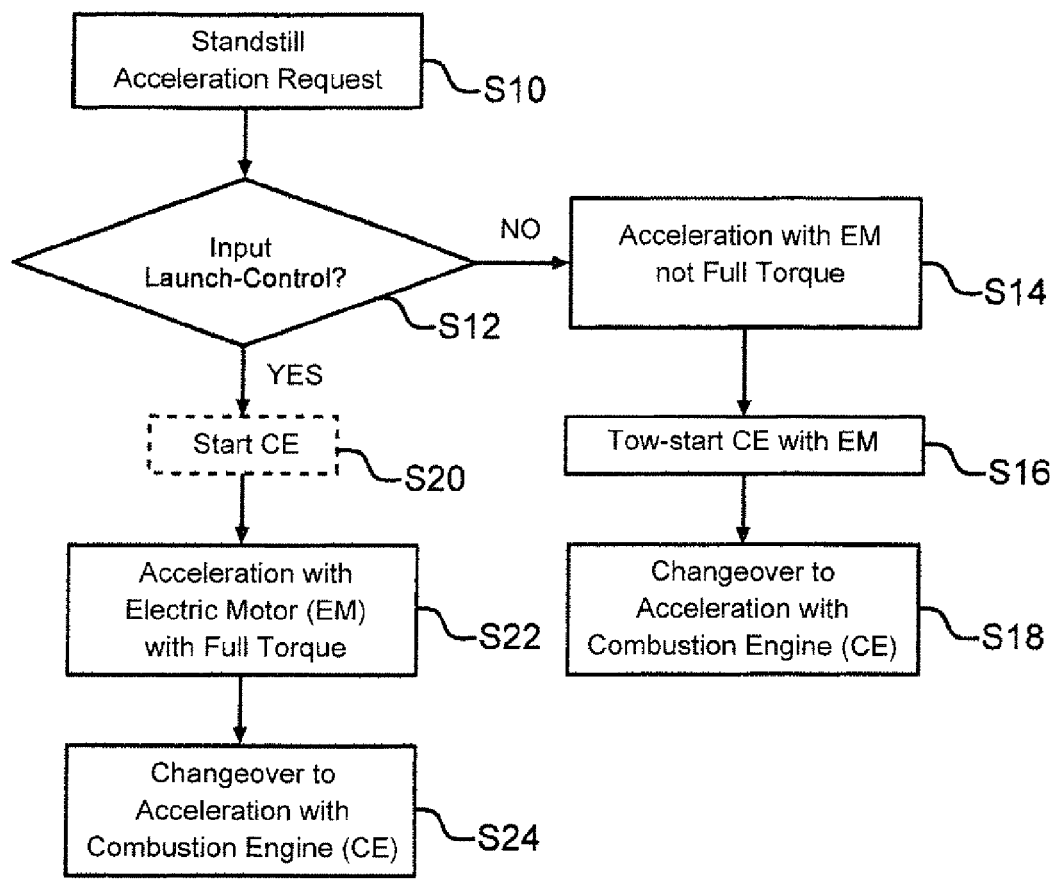

METHOD FOR ACCELERATING A VEHICLE AND HYBRID VEHICLE

CROSS-REFERENCES TO RELATED APPLICATIONS

This application is the U.S. National Stage of International Application No. PCT/EP2012/002094, filed May 16, 2012, which designated the United States and has been published as International Publication No. WO 2012/171607 and which claims the priority of German Patent Application, Serial No. 10 2011 104 395.4, filed Jun. 17, 2011, pursuant to 35 U.S.C. 119(a)-(d).

BACKGROUND OF THE INVENTION

The invention relates to a method for accelerating a vehicle having an electric motor as a drive and an internal combustion engine as a drive, in other words for accelerating a hybrid vehicle. The invention also relates to such hybrid vehicle.

In particular, when accelerating a hybrid vehicle from a standstill, it makes sense to initially carry out the acceleration with assistance from the electric motor, because the electric motor is capable of producing a high torque at low rotation speeds. A changeover to the drive with the internal combustion engine is advantageous at higher rotation speeds.

However, the internal combustion engine has frequently previously been turned off, for example in a start-stop operation following a complete stop of the vehicle. If it is desired to turn the internal combustion engine on after the acceleration by the electric motor has begun, the internal combustion engine must first be tow-started to be started. A separate electric motor can be used for tow-starting; but this case is not of interest here. Presently, the situation is considered where the electric motor operates not only as a drive, but is also used for tow-starting the engine.

If it is desired to also tow-start the engine with the accelerating electric motor in the midst of a driving phase with acceleration, a certain torque to be provided by the electric motor must be kept in reserve for tow-starting. In other words, only a partial torque of an available torque of the electric motor is used for acceleration, so that the difference between the available torque and the partial torque can then be subsequently used to tow-start the engine; otherwise, jerking would be produced while transitioning to tow-starting the engine due to the reduction of the driving torque; such jerking should be prevented.

From some vehicles, e.g. from sports cars, the so-called launch control is known. The vehicle can hereby be placed into a mode where it reaches a certain speed as fast as possible when accelerating from a standstill, for example as fast as possible from 0 to 100 km/hr. Sports vehicles have, for example, actuators which can be used to briefly switch this mode on, for example when starting at a traffic light. Such mode is not known for hybrid vehicles.

DE 10 2007 055 828 A1 describes a method for operating a hybrid vehicle wherein the internal combustion engine can be started in various modes from an electric drive mode. A tow-start, a rope start and an engine start with interrupted pulling-force are described as engine start variants. A start mode is selected here in response to a start request by using an evaluation of predetermined selection criteria depending on the current operating situation.

DE 10 2006 045 824 A1 describes a method for controlling a hybrid drive vehicle, in which various driving modes are provided, which relate to a boost behavior in a defined operating situation. Here, a mode can be selected by the driver via a manually operable sports switch.

DE 10 2009 027 642 A1 describes a method for operating a hybrid vehicle, wherein the hybrid vehicle starts up electrically at a first startup, wherein the internal combustion engine is started before, during or after the startup and is operated in a separated combustion operating mode for heating the catalytic converter. Furthermore, the internal combustion engine is prevented from contributing to the propulsion as long as the catalytic converter has not heated up.

SUMMARY OF THE INVENTION

It is the object of the invention to provide a method for accelerating a hybrid vehicle as well as a hybrid vehicle, with which new possibilities for operating the hybrid vehicle are created.

In the method according to the invention, the acceleration takes place selectively in two modes: In a first mode, the electric motor initially accelerates the vehicle with a partial torque of an available torque, subsequently continues this acceleration and simultaneously tow-starts the internal combustion engine (preferably at most with the difference between available torque and the partial torque), wherein the internal combustion engine contributes to the acceleration of the vehicle after being tow-started. In a second mode, the electric motor initially accelerates the vehicle with the total available torque whereas the internal combustion engine subsequently takes over the acceleration of the vehicle or contributes to the acceleration, wherein in the second mode the internal combustion engine is turned on at the beginning of the acceleration or when the second mode is selected, and is operated at idle speed until the internal combustion engine contributes to the acceleration of the vehicle.

The invention is based on the observation that the acceleration may be advantageous or desirable according to the one mode or according to the other mode, depending on the situation. In the first mode, it is ensured that jerking is eliminated or at least reduced when the electric motor is transitioning to tow-starting the engine. This ensures a pleasant riding comfort in the first mode. Conversely, in the second mode, the vehicle can be accelerated more quickly, which can be very important in some situations, either to satisfy of a driver's request or to enhance the safety while driving, such as when passing another vehicle.

In the second mode, the internal combustion engine is already turned on at the beginning of the acceleration or even when the second mode is activated, is thereafter operated at idle speed until the internal combustion engine takes over the acceleration of the vehicle. The aforementioned jerking can thus be prevented. The increased fuel consumption is acceptable in order to reliably achieve the desired rapid acceleration.

Preferably, an actuating element is actuated before the acceleration, when the second mode is to be assumed. The vehicle operator can thereby be very quickly provided with the option to select the mode.

The invention is in principle also applicable when the acceleration does not occur from a standstill, but instead from a low speed. However, a new functionality is already created when acceleration takes place from a standstill. This may be associated with a start-stop operation of the vehicle wherein the internal combustion engine is turned off when the vehicle is stopping (or stops).

The motor vehicle according to the invention is characterized by an input device, preferably in the form of an actuator, for changing a mode assumed during acceleration (in particular from a standstill), wherein the modes are the two above-mentioned modes mentioned above in relation to the method of the invention.

In the motor vehicle according to the invention, a respective mode can be selected in a very straightforward manner, in a particularly fast manner usually with an actuating device, which is perceived by the driver as comfortable; an additional functionality is provided in the motor vehicle by the two modes, because the motor vehicle now has the possibility of a so-called "launch control".

BRIEF DESCRIPTION OF THE DRAWING

A preferred embodiment of the invention will be described hereinafter in more detail with reference to the drawing, which shows in:

FIG. 1 as the only Figure, a flow diagram illustrating an embodiment of the method according to the present invention.

DETAILED DESCRIPTION OF PREFERRED EMBODIMENTS

A hybrid vehicle is equipped with an electric motor and an internal combustion engine. Both can operate on the same axis, but the invention is also applicable when the electric motor operates on the one axle and the internal combustion engine operates on the other axle. The invention is also applicable when a hybrid drive with an electric motor and an internal combustion engine is provided for one axle and an additional drive, in particular an additional electric motor, is provided on the other axle.

A hybrid vehicle is typically operated such that the internal combustion engine is turned off when the vehicle stops excessive quantities of exhaust gas from reaching the environment and to prevent excessive fuel consumption.

The method in the present embodiment begins after such a stop, i.e. when the vehicle is at a standstill, at step S10, wherein in the present example an acceleration request is to be given; for example, the vehicle operator may have operated the gas pedal, an automatic speed control may have recognized that the preceding vehicle motor vehicle has started to move from a standstill or a traffic signal is switched to green, or another input element in the motor vehicle may have been operated by the driver.

After step S10, it is checked at step S12 whether a specific command has occurred, namely a command relating to the so-called "launch control". During the launch control, the motor vehicle is to be accelerated with the highest possible acceleration. A control element, such as control button, is available in the motor vehicle for the command. As long as there was no command at step S12, but an acceleration request is given at step S10, the acceleration is performed at step S14 with the electric motor, however without taking advantage of its full available torque. The reason for this is that after an initial phase of the acceleration, the internal combustion engine of the vehicle starts to be tow-started, at step S16, by the electric motor at a certain rotation speed, i.e. the rotation speed of the internal combustion engine is increased, for example, by closing a clutch between the electric motor and the internal combustion engine. Since the acceleration at step S14 is performed with only a partial torque of the available torque, a residual torque is still available that can be used for tow-starting. The acceleration with the electric motor can thus be continued during tow-starting of the internal combustion engine, while the driver notices no or only a small effect from the tow-starting of the internal combustion engine. In particular, there is no jerking with decreasing acceleration. After a phase when the internal combustion engine is tow-started and reaches a certain speed, a change is made at step S18, with the internal combustion engine subsequently taking at least partially over the acceleration.

When, at step S12, a command for launch control received—this may be the same command that also communicated the acceleration request—, the internal combustion engine is optionally started immediately, at step S20, The internal combustion engine can here be tow-started by the electric motor, wherein an acceleration can simultaneously be produced by the electric motor during startup, albeit not at full torque. In any case, the internal combustion engine is initially started, transitioning thereafter at step S22 to an acceleration with the electric motor, with the acceleration being produced with the full available torque. The internal combustion engine continues to run until, at step S24, changing over to an acceleration with the internal combustion engine.

The mode in accordance with the steps S20, S22 and S24 allows a particularly rapid acceleration at the expense of fuel economy, i.e. with a command, such as a request from a driver. Otherwise, a mode according to steps S14, S16 and S18 is assumed which is perceived by the driver as comfortable and fuel-saving.

The invention claimed is:

1. A method for accelerating a vehicle having an electric motor as one drive and an internal combustion engine as another drive, the method comprising:
providing two modes for accelerating the vehicle and selecting for acceleration of the vehicle one of the two modes,
in a first selected mode, accelerating the vehicle initially with the electric motor with a partial torque of an available torque and thereafter continuing to accelerate the vehicle while simultaneously tow-starting the internal combustion engine, with the internal combustion engine, after having been tow-started, contributing to the acceleration of the vehicle, and
in a second selected mode, turning the internal combustion engine on when beginning to accelerate or when selecting the second mode,
initially accelerating the vehicle with a full available torque from the electric motor while operating the internal combustion engine at idle speed, and
thereafter increasing the operating speed of the internal combustion engine above the idle speed so that the internal combustion engine contributes to the acceleration of the vehicle.

2. The method of claim 1, further comprising, when the second mode is to be assumed, actuating an actuating element prior to acceleration.

3. The method of claim 1, wherein the acceleration takes place from a standstill.

4. A motor vehicle, comprising:
a first drive comprising an electric motor,
a second drive comprising an internal combustion engine,
an input device configured to select or change a mode assumed during an acceleration of the motor vehicle, wherein
in a first selected mode, the electric motor initially accelerates the vehicle with a partial torque of an available torque and thereafter continues to accelerate the vehicle while simultaneously tow-starting the internal combustion engine, with the internal combustion engine, after having been tow-started, contributing to the acceleration of the vehicle, and in a second selected mode, the internal combustion engine is turned on when the acceleration begins or when the second mode is selected, the electric motor initially accelerates the vehicle with a full available torque while the internal combustion engine operates at idle speed, and the operating speed of the internal combustion engine is thereafter increased above the idle speed so that the internal combustion engine contributes to the acceleration of the vehicle.

\* \* \* \* \*

UNITED STATES PATENT AND TRADEMARK OFFICE
CERTIFICATE OF CORRECTION

PATENT NO. : 8,831,859 B2  
APPLICATION NO. : 14/126709  
DATED : September 9, 2014  
INVENTOR(S) : Karl-Heiz Meitinger et al.

Page 1 of 1

It is certified that error appears in the above-identified patent and that said Letters Patent is hereby corrected as shown below:

On the Title Page, item (73) Assignee: correct "INGOLDSTADT" to --INGOLSTADT--.

Signed and Sealed this
Twenty-first Day of April, 2015

Michelle K. Lee
*Director of the United States Patent and Trademark Office*